United States Patent [19]

Tomotsu et al.

[11] Patent Number: 5,272,229

[45] Date of Patent: Dec. 21, 1993

[54] PROCESS FOR PRODUCING A STYRENE POLYMER HAVING HIGH DEGREE OF SYNDIOTACTIC CONFIGURATION

[75] Inventors: Norio Tomotsu; Mizutomo Takeuchi; Masahiko Kuramoto, all of Ichihara, Japan

[73] Assignee: Idemitsu Kosan Co., Ltd., Tokyo, Japan

[21] Appl. No.: 801,389

[22] Filed: Dec. 2, 1991

[30] Foreign Application Priority Data

Dec. 28, 1990 [JP] Japan ................... 2-415574

[51] Int. Cl.$^5$ ............................. C08F 12/08
[52] U.S. Cl. ...................... 526/115; 526/114; 526/132; 526/133; 526/148; 526/151; 526/159; 526/160; 526/347.2; 502/113
[58] Field of Search ............ 526/160, 115, 134, 77, 526/132, 133, 114, 148, 151

[56] References Cited

U.S. PATENT DOCUMENTS

5,064,802 11/1991 Stevens et al. ............ 526/134 X
5,066,741 11/1991 Campbell, Jr. ............ 526/346 X

FOREIGN PATENT DOCUMENTS

0277004 8/1988 European Pat. Off. .
0421659 4/1991 European Pat. Off. .
0426638 5/1991 European Pat. Off. .
0427696 5/1991 European Pat. Off. .

OTHER PUBLICATIONS

Hackh's Chemical Dictionary, 4th ed., McGraw-Hill Inc., N.Y., p. 62 (1969).

*Primary Examiner*—Fred Teskin
*Attorney, Agent, or Firm*—Oblon, Spivak, McClelland, Maier & Neustadt

[57] ABSTRACT

There are disclosed a process for producing a styrene polymer having a high degree of syndiotactic configuration at a reduced cost and an enhanced efficiency, and a catalyst to be used therefore which comprises (A) a specific transition-metal compound, (B) a specific coordination complex compound and (C) a compound having an alkyl group.

The catalyst according to the present invention is inexpensive compared with the conventional catalyst containing aluminoxane as the major ingredient, and exhibits a high activity in polymerizing a styrenic monomer into styrene polymer with a high degree of syndiotacticity as well as a high yield and conversion rate.

2 Claims, No Drawings

PROCESS FOR PRODUCING A STYRENE POLYMER HAVING HIGH DEGREE OF SYNDIOTACTIC CONFIGURATION

BACKGROUND OF THE INVENTION

1 Field of the Invention

The present invention relates to a process for producing a styrene polymer and a catalyst for use therein. More particularly, it pertains to a process for efficiently producing a styrene polymer having a high degree of syndiotactic configuration in the stereochemical structure of the polymer main chain and to a catalyst to be used for the process.

2. Description of the Related Arts

It has recently been disclosed by the present inventors that a styrene polymer having a syndiotactic configuration is obtained by polymerizing a styrenic monomer by the use of a catalyst comprising as primary ingredients a transition-metal compound, especially a titanium compound and an alkylaluminoxane (Refer to Japanese Patent Application Laid-Open Nos. 187708/1987, 179906/1988, 241009/1988, etc.).

Methylaluminoxane, particularly suitable as an alkylaluminoxane is obtained usually by the reaction between trimethylaluminum and water. However, the above-mentioned reaction involves the problem that the reaction is difficult to put into practical production because of its violent reaction, and further suffers the disadvantage that in addition to requiring expensive trimethylaluminum as the starting material, an excessively large amount of methylaluminoxane is required as a component of the catalyst as compared with the quantity of a transition metal, thus causing an extremely expensive catalyst.

There has recently been reported that a polymerization catalyst not containing aluminoxane is capable of polymerizing α-olefin(principally, ethylene) by R. Taube (J. Organomet. Chem. C9–C11, 347 (1988)), H. Turner (J. Am. Chem. Soc. 111,2728 (1989)), R. F. Jordan (Organomet. 8,2892 (1989)), etc. Nevertheless, investigation has not yet been made on a polymerization catalyst not containing aluminoxane for the polymerization of styrenic monomer, leaving the problem that styrenic monomer, different from 60 -olefin, is likely to be polymerized into an atactic polymer in the presence of a cationic species.

SUMMARY OF THE INVENTION

It is an object of the present invention to provide a process for effectively producing a styrene polymer having a high degree of syndiotactic configuration.

It is another object of the present invention to provide a catalyst capable of efficiently polymerizing a styrenic monomer into a styrene polymer having a high degree of syndiotactic configuration without the use of expensive aluminoxane required in a large quantity.

Other objects of the present invention will be obvious from the text of the specification hereinafter disclosed.

As the result of intensive research and investigation made by the present inventors for the purpose of attaining the above-described object, it has been found that the use of a catalyst combination comprising a specific transition-metal compound and a specific salt is capable of efficiently producing the objective styrene polymer having a high degree of syndiotactic configuration by virtue of its markedly improved activity. The present invention has been accomplished on the basis of the aforestated finding and information.

Specifically, the present invention provides a catalyst for the production of a styrene polymer having a high degree of syndiotactic configuration which comprises (A) a transition-metal compound not having any of metal-hydrogen bonds, metal-carbon σ-bonds and metal-silicon σ-bonds, (B) a coordination complex compound comprising a cation and an anion in which a plurality of radicals are bonded to a metal and (C) a compound having an alkyl group. The present invention also provides a process for producing a styrene polymer which comprises polymerizing styrene and/or a styrene derivative in the presence of the foregoing catalyst.

DESCRIPTION OF PREFERRED EMBODIMENTS

The catalyst according to the present invention comprises as the primary ingredients, components (A), (B) and (C). The component (A) is a transition-metal compound without any of metal-hydrogen bonds, metal-carbon σ-bonds and metal-silicon σ-bonds. As transition metals, mention may be made of the metals belonging to Group III, IV, V or VI in the Periodic Table and Lanthanide Series, and among them, Group IV metals including titanium, zirconium and hafnium are preferable, and titanium is most suitable. The suitable transition-metal compound is that having oxygen, sulfur, nitrogen, halogen (chlorine, bromine, fluorine) or the like together with the aforementioned transition metal.

These elements are incorporated into the compounds in a variety of forms, for example, oxygen is incorporated as an alkoxy or aryloxy (OR; R is an alkyl group or aryl group), an ester (COOR; R represents the same as above), acetylacetonate (AcAc) or the like, sulfur as alkylthio or arylthio (SR: R represents the same as above) or the like and nitrogen as alkylamino, arylamino, dialkylamino, diarylamino (NHR, NR$_2$: R represents the same as above) or the like.

A transition-metal compound of the component (A) can be represented by the general formula (I)

$$M^1R^1R^2R^3R^4 \qquad (I)$$

wherein $M^1$ is a transition metal; $R^1$, $R^2$, $R^3$ and $R^4$ are each an alkoxy group, aryl group, aryloxy group, halogen atom, thiol group, arylthio group, amino group, alkylamino group, acetylaoetonate group, chelating agent or ligand of conjugated π-electron system such as cyclopentadienyl group, substituted cyclopentadienyl group, indenyl group or fluorenyl group. In addition to the combinations of the above, the compound may be a bidentate coordination complex compound such as 2,2'-thiobis(4-methyl-6-tert-butylphenyl)titanium diisopropoxide; 2,2'-thiobis(4-methyl-6-tert-butylphenyl)-titanium dimethoxide or the like.

The preferable compound is that in which one of $R^1$, $R^2$, $R^3$ and $R^4$ is a ligand of conjugated π-electron system. Specific examples of the transition-metal compound represented by the general formula (I) include cyclopentadienyltitanium trimethoxide, cyclopentadienyltitanium triethoxide, pentamethylcyclopentadienyltitanium trimethoxide, pentamethylcyclopentadienyltitanium triethoxide, cyclopentadienyltitanium trichloride, pentamethylcyclopentadienyltitanium trichloride, cyclopentadienylmonomethoxytitanium dichloride, cyclopentadienyldimethoxytitanium monochloride, pentamethylcyclopentadienylmonomethoxytitanium dichloride, cyclopentadienyltitanium triphenoxide, pentamethylcyclopentadienyltitanium triphenoxide, cyclopentadienyldiphenoxytitanium monochloride, pentamethylcyclopentadienyldiphenoxytitanium monochloride, cyclopentadienylmonophenoxytitanium dichloride, pentamethylcyclopentadienylmonophenoxytitanium dichloride, cyclopentadienyltribenzyltitanium, pentamethylcyclopentadienyltribenzyltitanium, indenyltitanium trichloride, indenyltitanium trimethoxide, indenyltitanium triethoxide, and indenyltribenzyltitanium, etc.

The component (B) according to the present invention is a coordination complex compound comprising a cation and an anion in which a plurality of radicals are bonded to a metal. A variety of such coordination complex compounds are available, and those represented by the following general formula (II) or (III) are preferably employed:

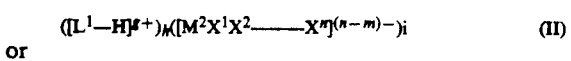  (II)

or

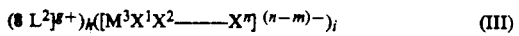  (III)

wherein $L^2$ is $M^4$, $R^5R^6M^5$ or $R^7{}_3C$ as hereinafter described; $L_1$ is a Lewis base; $M^2$ and $M^3$ are each a metal selected from Groups V to XV of the Periodic Table; $M^4$ is a metal selected from Groups VIII to XII of the Periodic Table; $M^5$ is a metal selected from Groups VIII to X of the Periodic Table; $X^1$ to $X^n$ are each a hydrogen atom, dialkylamino group, alkoxy group, aryloxy group, alkyl group having 1 to 20 carbon atoms, aryl group having 6 to 20 carbon atoms, alkylaryl group, arylalkyl group, substituted alkyl group, organometalloid group or halogen atom; $R^5$ and $R^6$ are each a cyclopentadienyl group, substituted cyclopentadienyl group, indenyl group or fluorenyl group; $R^7$ is an alkyl group; m is the valency of each of $M^2$ and $M^3$, indicating an integer of 1 to 7; n is an integer of 2 to 8; g is the ion valency of each of $[L^1-H]$ and $[L^2]$, indicating an integer of 1 to 7; h is an integer of 1 or more; and $i = hxg/(n-m)$.

Specific examples of $M^2$ and $M^3$ include B, Al, Si, P, As, Sb, etc.; those of $M^4$ include Ag, Cu, etc.; and those of $M^5$ include Fe, Co, Ni, etc. Specific examples of $X^1$ to $X^n$ include dialkylamino group such as dimethylamino and diethylamino; alkoxyl group such as methoxy, ethoxy and n-butoxy; aryloxy group such as phenoxy, 2,6-dimethylphenoxy and naphthyloxy; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-di-methylphenyl, 3,5-dimethylphenyl, 2,4-dimethylphenyl and 1,2-dimethylphenyl; halogen such as F, Cl, Br and I; and organometalloid such as pentamethylantimony group, trimethylsilyl group, trimethylgermyl group, diphenylarsine group, dicyclohexylantimony group and diphenylboron group. Specific examples of substituted cyclopetnadienyl of $R^5R^6$ include methylcyclopentadienyl, butylcyclopentadienyl and pentamethylcyclopentadienyl.

Among the compounds represented by the general formula (II) or (III), specific examples of preferably usable compounds include, as the compound of general formula (II), triethylammonium tetraphenylborate, tri(n-butyl)ammonium tetraphenylborate, trimethylammonium tetraphenylborate, triethylammonium tetra(pentafluorophenyl)borate, tri(n-butyl)ammonium tetra(pentafluorophenyl)borate, triethylammonium hexafluoroarsenate, etc., and as the compound of general formula (III), pyridinium tetra(pentafluorophenyl)borate, pyrrolinium tetra(pentafluorophenyl)borate, N,N-dimethylanilinium tetra(pentafluorophenyl)borate, methyldiphenylammonium tetra(pentafluorophenyl)borate, ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pertafluorophenyl)borate, silver tetraphenylborate, silver tetra(pentafluorophenyl)borate, trityltetraphenylborate, trityltetra(pentafluorophenyl)borate, silver hexafluoroarsenate, silver hexafluoroantimonate, silver tetrafluoroborate, etc.

The catalyst according to the present invention further comprises (C) a compound having an alkyl group. A variety of compounds having an alkyl group are available, and aluminum compounds having an alkyl group represented by the general formula (IV) are exemplified.

  (IV)

wherein $R^8$ and $R^9$ independently are each an alkyl group having 1 to 8, preferably 1 to 4 carbon atoms; X is a hydrogen atom or a halogen atom; m satisfies the relation $0 < m \leq 3$, desirably $m = 2$ or 3, more desirably $m = 3$; and n satisfies the relation $0 < n \leq 3$, desirably $n = 0$ or 1.

Also exemplified are magnesium compounds having an alkyl group represented by the general formula (V)

  (V)

wherein $R^8$ represents the same as above, zinc compounds having an alkyl group represented by the general formula (VI)

  (VI)

wherein $R^8$ represents the same as above, and the like.

The above-mentioned compounds having an alkyl group are desirably aluminum compounds having an alkyl group, more desirably trialkylaluminum compounds and dialkylaluminum compounds. Examples of (C) the compounds having an alkyl group to be used in the present invention include trialkylaluminum such as trimethylaluminum, triethylaluminum, tri-n-propylaluminum, triisopropylaluminum, tri-n-butylaluminum, triisobutylaluminum and tri-tert-butylaluminum; dialkylaluminum halide such as dimethylaluminum chloride, diethylaluminum chloride, di-n-propylaluminum chloride, diisopropylaluminum chloride, di-n-butylaluminum chloride, diisobutylaluminum chloride and di-tert-butylaluminum chloride; dialkylaluminum alkoxide such as dimethylaluminum methoxide and dimethylaluminum ethoxide; dialkylaluminum hydride such as dimethylaluminum hydride, diethylalumium hydride and diisobutylaluminum hydride; dialkylmagnesium such as dimethylmagnesium, diethylmagnesium, di-n-propylmagnesium and diisopropylmagnesium; and dialkylzinc such as dimethylzinc, diethylzinc, di-n-propylethylzinc and diisopropylzinc, and the like.

The catalyst of the present invention which comprises the abovestated components (A), (B) and (C) as primary ingredients can be prepared by various methods including:

(1) a method in which the reaction product of the components (A) and (B) is added with the component (C) to produce the catalyst, which is then brought into contact with a monomer or monomers to be polymerized;

(2) a method in which the reaction product of the components (A) and (C) is added with the component (B) to produce the catalyst, which is then brought into contact with a monomer or monomers to be polymerized;

(3) a method in which each of the components (A), (B) and (C) is added to a monomer or monomers to be polymerized one by one in any order. The reaction product of the components (A) and (B) may be isolated and purified in advance.

The addition or contact of the above-mentioned components (A), (B) and (C) may be carried out at the polymerization temperature of at 0° to 100° C.

As described hereinbefore, the catalyst according to the present invention exhibits a high activity for the production of a styrene polymer having a high degree of syndiotactic configuration. Hence, the present invention further provides a process for producing a styrene polymer having a high degree of syndiotactic configuration by the use of the above-stated catalyst.

The production of a styrene polymer according to the process of the present invention is put into practice by polymerizing or copolymerizing styrenic monomers such as styrene and/or a styrene derivative exemplified by an alkylstyrene, alkoxystyrene, halogenated styrene, vinyl benzoate ester, etc. in the presence of the catalyst comprising the foregoing components (A), (B) and (C) as essential ingredients. As described above, there are available a variety of methods for bringing the catalyst of the present invention into contact with a styrenic monomer or monomers.

The polymerization of a styrenic monomer or monomers may be carried out by means of bulk polymerization or solution polymerization by the use of an aliphatic hydrocarbon solvent such as pentane, hexane or heptane, an alicyclic hydrocarbon solvent such as cyclohexane or an aromatic hydrocarbon solvent such as benzene, toluene or xylene. The polymerization temperature is not specifically limited, but is usually in the range 0° to 105° C., preferably 20° to 100° C.

The molecular weight of the styrene polymer to be obtained can be effectively modified by means of polymerization reaction in the presence of hydrogen.

The styrene polymer thus obtained possesses a high degree of syndiotactic configuration. Here, the styrene polymer having a high degree of syndiotactic configuration means that its stereochemical structure is mainly of syndiotactic configuration, i.e. the stereostructure in which phenyl groups or substituted phenyl group as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrene polymers having a high degree of syndiotactic configuration" as mentioned in the present invention means polystyrene, poly(alkylstyrene), poly(halogenated styrene), poly(alkoxystyrene), poly(vinylbenzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) include poly(methylstyrene), poly(ethylstyrene), poly(isopropylstyrene), poly(tert-butylstyrene), etc., poly(halogenated styrene) include, poly(chlorostyrene), poly(bromostyrene), and poly(fluorostyrene), etc. The poly(alkoxystyrene) include, poly(methoxystyrene), poly(ethoxystyrene), etc.

The most desirable styrene polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

The styrene polymer obtained according to the process of the present invention is that with a high degree of syndiotacticity usually having a weight-average molecular weight of 10,000 to 3,000,000, preferably 100,000 to 1,500,000 with a number-average molecular weight of 5,000 to 1,500,000, preferably 50,000 to 1,000,000. Moreover, the styrene polymer having an exceptionally high degree of syndiotacticity as well as an extremely high purity can be obtained by the steps of deashing treatment of the polymer thus obtained, as required, with a washing agent containing hydrochloric acid, etc.; additional washing; drying under reduced pressure; cleaning with a solvent such as methyl ethyl ketone for removing solubles therein; and treatment of the insolubles thus obtained by the use of chloroform, etc.

The styrene polymer with a high degree of syndiotacticity has a melting point of 160° to 310° C. and is remarkably superior to the conventional styrene polymer with an atactic configuration in terms of heat resistance.

The catalyst according to the present invention is inexpensive as compared with the conventional catalyst comprising an aluminoxane as a primary ingredient, and exhibits a high activity for the production of a styrene polymer having a high degree of syndiotactic configuration. According to the process of the present invention, therefore, a syndiotactic styrene polymer is obtained at a reduced production cost and with enhanced efficiency.

The present invention will be described in more detail with reference to the following nonlimiting Examples and Comparative Examples.

EXAMPLE 1

Into a 500 ml reaction vessel, 200 ml of styrene was placed with heating to 70° C., and then, 5 ml of a mixed contact solution of 0.005 mmol of pentamethylcyclopentadienyltitanium trimethoxide, 0.005 mmol of 1,1'-dimethylferrocenium tetra(pentafluorophenyl)borate and 0.05 mmol of triisobutylaluminum in toluene was added thereto, and polymerization was carried out at 70° C. for 4 hours. After the reaction, polymerization was arrested with methanol, and the mixture was deashed with hydrochloric acid-methanol, washed with methanol, and dried to give 42.3 g of polymer. The polymer was subjected to extraction with a Soxhlet extractor using methyl ethyl ketone as a solvent to give an extraction residue (methyl ethyl ketone insoluble portion; MIP) of 97% by weight. It was confirmed that the resultant polymer was a syndiotactic polystyrene having a melting point (Tm) of 268° C. and a weight-average molecular weight of 750,000.

EXAMPLE 2

The procedure in Example 1 was repeated except that 0.2 mmol of triisobutylaluminum was added instead of 0.05 mmol of the same. The polymer was obtained in a yield of 52.0 g as an extraction residue (MIP) of 98% by weight, and was a syndiotactic polystyrene having a melting point (Tm) of 268° C. and a weight-average molecular weight of 570,000.

The catalyst according to the present invention is inexpensive as compared with the conventional catalyst comprising an aluminoxane as a primary ingredient, and exhibits a high activity for the production of a styrene polymer having a high degree of syndiotactic configuration. According to the process of the present invention, therefore, a syndiotactic styrene polymer is obtained at a reduced production cost and with an enhanced efficiency.

EXAMPLE 3

The procedure of Example 1 was repeated except that 1,2,4-trimethylcyclopentadienyltitanium trimethoxide was used in place of pentamethylcyclopentadienyltitanium trimethoxide. The polymer was obtained in a yield of 24.3 g as an extraction residue (MIP) of 96% by weight, and was a syndiotactic polystyrene having a melting point (Tm) of 266° C. and a weight-average molecular weight of 117,000.

EXAMPLE 4

The procedure of Example 1 was repeated except that cyclopentadienyltitanium trimethoxide was used in place of pentamethylcyclopentadienyltitanium trimethoxide and 0.02 mmol of triisobutylaluminum was added instead of 0.05 mmol of the same. The polymer was obtained in a yield of 36.3 g as an extraction residue (MIP) of 16.3% by weight, and was a syndiotactic polystyrene having a weight-average molecular weight of 53,000.

EXAMPLE 5

The procedure of Example 1 was repeated except that pentamethylcyclopentadienyltitanium trichloride was used in place of pentamethylcyclopentadienyltitanium trimethoxide and 0.02 mmol of triisobutylaluminum was added instead of 0.05 mmol of the same. The polymer was obtained in a yield of 47.8 g as an extraction residue (MIP) of 53.7% by weight, and was a syndiotactic polystyrene having a weight-average molecular weight of 537,000.

EXAMPLE 6

The procedure of Example 1 was repeated except that the transition metal represented by the formula A

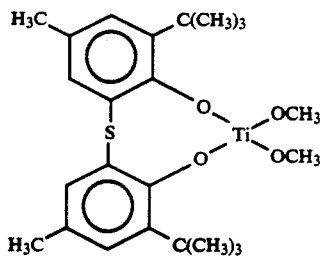

was used in place of pentamethylcyclopentadienyltitanium trimethoxide and 0.02 mmol of triisobutylaluminum was used instead of 0.05 mmol of the same. The polymer was obtained in a yield of 3.8 g as an extraction residue (MIP) of 52.4% by weight, and was a syndiotactic polystyrene having a weight-average molecular weight of 146,000.

EXAMPLE 7

The procedure of Example 1 was repeated except that 0.02 mmol of trimethylaluminum was used in place of 0.05 mmol of triisobutylaluminum. The polymer was obtained in a yield of 74.2 g as an extraction residue (MIP) of 94.9% by weight, and was a syndiotactic polystyrene having a weight-average molecular weight of 1,238,800.

EXAMPLE 8

The procedure of Example 7 was repeated except that trimethylaluminum, pentamethylcyclopentadienyltitanium trimethoxide and 1,1'-dimethylferrocenium tetra(pentafluorophenyl)borate were each added in that order. The polymer was obtained in a yield of 83.2 g as an extraction residue (MIP) of 89.4% by weight, and was a syndiotactic polystyrene having a weight-average molecular weight of 1,123,000.

EXAMPLE 9

The procedure in Example 1 was repeated except that polymerization temperature was 95° C. instead of 70° C. The polymer was obtained in a yield of 23.8 g as an extraction residue (MIP) of 97% by weight and was a syndiotactic polystyrene having a melting point (Tm) of 268° C. and a weight average molecular weight of 250,000.

COMPARATIVE EXAMPLE 1

The procedure of Example 1 was repeated except that triisobutylaluminum was not used. As a result, no polymer was obtained.

What is claimed is:

1. A process for producing a styrene polymer having a syndiotacticity in which the proportion of racemic diad is at least 75%, which comprises:

polymerizing a styrenic monomer in the presence of a catalyst comprising as primary ingredients (A) a transition metal compound Formula (I): $M^1R^1R^2R^3R^4$, wherein $M^1$ is titanium; $R^1$; $R^2$, $R^3$ and $R^4$ are each a cyclopentadienyl group, a substituted cyclopentadienyl group, alkoxy or halogen; (B) a coordination complex compound of the formula:

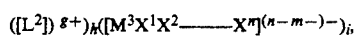

wherein $L^2$ is $m^4$, which is a metal selected from Groups VIII to XII of the Periodic Table, $R^5R^6M^5$ or $R^7{}_3C$, wherein $M^5$ is a metal selected from Groups VIII to X of the Periodic Table, $R^5$ and $R^6$ are each a cyclopentadienyl group, a substituted cyclopentadienyl group, indenyl or fluorenyl and $R^7$ is alkyl; $M^3$ is boron; $X^1$ to $X^n$ are each a member selected from the group consisting of phenyl, p-tolyl, benzyl, 4-tert-butylphenyl, 2,6-di-methylphenyl, 3,5-dimethylphenyl, 2,4-dimethylphenyl, 1,2-dimethylphenyl, pentafluoropheynyl, and 3,5-di(-trifluoromethyl) phenyl; m is the valency of $M^3$ and is an integer of 1 to 7; n is an integer of 2 to 8; g is the ion valency of $[L^2]$, wherein the integer of the valency state ranges from 1 to 7; h is an integer of 1 or more and $i = hxg/(n-m)$; and (C) a compound selected from the group consisting of $R^8{}_3$ Al, $R^8{}_2$ Mg and $R^8{}_2$ Zn, wherein $R^8$ is an alkyl group of 1 to 8 carbon atoms.

2. The process according to claim 1, wherein (C) the compound having an alkyl group is an aluminum compound having an alkyl group.

* * * * *